United States Patent [19]

Hartwig

[11] 4,042,605
[45] Aug. 16, 1977

[54] PROCESS FOR THE PRODUCTION OF 1,4-DIAMINOANTHRAQUINONE-2,3-DINITRILE

[75] Inventor: Ernst Hartwig, Heidelberg, Germany

[73] Assignee: BASF Aktiengesellschaft, Ludwigshafen (Rhine), Germany

[21] Appl. No.: 686,366

[22] Filed: May 14, 1976

[30] Foreign Application Priority Data

June 4, 1975 Germany .......................... 2524748

[51] Int. Cl.² .......................... C09B 1/00; C09B 1/36
[52] U.S. Cl. ..................................... 260/378; 260/369
[58] Field of Search ................................ 260/378, 369

[56] References Cited

U.S. PATENT DOCUMENTS

| 1,728,216 | 9/1929 | Schirmacher et al. | 260/369 |
| 1,879,535 | 9/1932 | Schmidt et al. | 260/378 X |
| 2,496,414 | 2/1950 | Seymour et al. | 260/378 X |
| 2,525,621 | 10/1950 | Scalera et al. | 260/369 X |
| 3,084,015 | 4/1963 | Grossmann et al. | 260/378 X |
| 3,203,751 | 8/1965 | Hildreth | 260/378 X |
| 3,739,009 | 6/1973 | Sturm et al. | 260/378 X |

Primary Examiner—Paul F. Shaver
Attorney, Agent, or Firm—Keil, Thompson & Shurtleff

[57] ABSTRACT

A process for the production of 1,4-diaminoanthraquinone-2,3-dinitrile by the reaction of a diaminoanthraquinone of the formula (I):

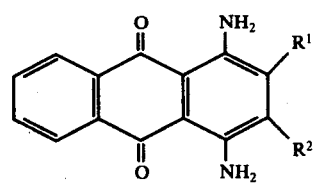

in which $R^1$ and $R^2$ independently of one another are hydrogen, chloro or bromo, with an ionic cyanide in a polar aprotic solvent, the reaction in the case when $R^1$ and $R^2$ are both hydrogen being carried out in the presence of an ammonium salt and the reaction product formed is dehydrogenated or the reaction is carried out with the ionic cyanide under dehydrogenating conditions.

The process yields the dinitrile of formula (I) in which $R^1 = R^2 = CN$ in a good yield and high purity.

1,4-diaminoanthraquinone-2,3-dinitrile is a dye and an important starting material for the manufacture of dyes.

17 Claims, No Drawings

PROCESS FOR THE PRODUCTION OF 1,4-DIAMINOANTHRAQUINONE-2,3-DINITRILE

The invention relates to a process for the production of 1,4-diaminoanthraquinone-2,3-dinitrile.

1,4-diaminoanthraquinone-2,3-dinitrile is an important starting material for the manufacture of dyes. The dinitrile is moreover used as a dye (DT-OS 1,906,272; BE-PS 650,748).

A number of methods have been known for a long time for the production of the said dinitrile. The method having commercial importance is based on the placement of the sulfonic acid group in the β-position by the cyano group (German Pat. No. 536,998, Example 8). More recently this method has been improved by passing air or oxygen into the mixture during reaction in the presence of a heavy metal catalyst in order to increase the yield of 1,4-diaminoanthraquinone-2,3-dinitrile (German Pat. No. 1,108,704; German Published Application No. 1,906,834; Soviet Pat. No. 148,066). The starting material for this synthesis is 1aminoanthraquinone which is prepared from the anthraquinone-1-sulfonic acid obtainable by α-sulfonation of anthraquinone catalyzed by mercury.

Another method of synthesis starting from 1,4-diamino-2,3-dichloroanthraquinone is disclosed in German Pat. No. 935,669. Since the halogen atoms in the β-positions are very firmly attached and therefore cannot directly be replaced by cyano groups, the halogen atoms are activated by the formation of boric acid complexes of the 1,4-diamino compound and replaced by sulfonic acid groups by the action of an alkali metal sulfite. The sulfonic acid groups may then be replaced by cyano groups. Since the production of the boric acid complex is carried out in concentrated sulfuric acid the reaction mixture has to be buffered with a large amount of sodium phosphate for reaction with the sulfite. The space-time yield is greatly decreased because of the large volume by the dilution. This is very disadvantageous economically. Moreover, a filtrate rich in phosphate is obtained in the isolation and this has to be purified or processed for environmental reasons. An improvement in this method is disclosed in Japanese Published Application 17643/1974 according to which the two reaction steps are combined into a one-reactor method. The waste water problems are however also not avoided in this variant of the process.

It is the object of the present invention to provide a process for the production of 1,4-diaminoanthraquinone-2,3-dinitrile which permits the conversion of 1,4-diaminoanthraquinone or its derivatives bearing chlorine and/or bromine in the 2-position and/or the 3-position into 1,4-diaminoanthraquinone-2,3-dinitrile by a method which is easy to handle industrially.

We have found that 1,4-diaminoanthraquinone-2,3-dinitrile is obtained when a 1,4-diaminoanthraquinone of the formula:

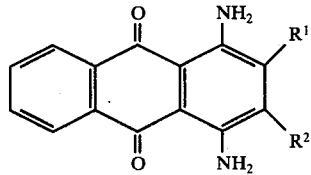

in which, independently of one another, $R^1$ and $R^2$ are hydrogen, chloro or bromo is reacted with an ionic cyanide in a polar aprotic solvent and in the case when both $R^1$ and $R^2$ are hydrogen the reaction is carried out in the presence of an ammonium salt and the reaction product is dehydrogenated or the reaction is carried out under dehydrogenating conditions.

1,4-diaminoanthraquinone-2,3-dinitrile, also referred to hereinafter as the dinitrile, is obtained in high purity and a good yield by the process according to the invention. The process moreover has the advantage that the starting compound is based not on 1-aminoanthraquinone but on quinizarine.

It is surprising that it is possible in an aprotic polar solvent to replace a chloro or bromo in the 2-position and/or the 3-position by cyanide. Moreover it was not to be expected that 1,4-diaminoanthraquinone would react with cyanide in the polar aprotic solvent in the presence of an ammonium salt and that the reaction product would be converted by dehydrogenation into 1,4-diaminoanthraquinone-2,3-dinitrile. It is known from German Pat. No. 1,250,031 that 1-oxo-3-imino-4,7-diamino-5,6-phthaloydihydroisoindole is formed from 1,4-diaminoanthraquinone in dimethylsulfoxide with cyanide while passing air through.

1,4-diaminoanthraquinone or its 2-chloro, 2-bromo, 2,3-dichloro or 2,3-bromo compound is suitable as the starting material for the process according to the invention. For economical reasons 1,4-diaminoanthrquinone is preferred.

Alkali metal cyanides and ammonium cyanide and preferably potassium cyanide, sodium cyanide and ammonium cyanide are suitable as ionic cyanides. The amount of cyanide is at least that required stoichiometrically. It is more convenient however to use an excess of up to five times and preferably from twice to three times the amount stoichiometrically necessary.

A polar aprotic solvent is used as reaction medium for the process according to the invention. Examples of such are: an N,N-di-$C_1$ to $C_3$-alkylamide of a $C_1$ to $C_3$ carboxylic acid, such as N,N-dimethylformamide, N,N-diethylformamide, N,N-dipropylformamide, N,N-dimethylacetamide, N,N-diethylacetamide, N,N-dipropylacetamide, N,N-dimethylpropionamide, N,N-diethylpropionamide, N,N-dipropylpropionamide, N-formylmorpholine and N-formylpiperidine; a cyclic N-alkylcarboxamide such as N-methylpyrrolidone; a hexa-$C_1$- to -$C_3$-alkyl phosphoric triamide such as N,N,N',N',N'',N''-hexamethyl phosphoric triamide; and sulfoxides such as dimethyl sulfoxide or tetramethylene sulfoxide or mixtures of these solvents. Dimethylformamide, dimethyl sulfoxide, N-methylpyrrolidone or mixtures thereof are preferred as the polar aprotic solvents.

The amount of polar aprotic solvent used as the reaction medium is not critical and may therefore be varied within wide limits, provided the reaction mixture can be mixed before, during and after the reaction. The amount of solvent generally used is from three to thirty and preferably from six to 10 times the weight of the diaminoanthraquinone or derivative used as starting material.

When 1,4-diaminoanthraquinone itself is used as starting material a suitable ammonium salt is a salt of ammonia, a salt of a primary, secondary and/or tertiary amine, a salt of a quaternary ammonium base or a mixture of such salts. Examples of salts of ammonia are ammonium chloride, ammonium sulfate, ammonium phosphate and ammonium acetate. Primary, secondary and/or tertiary amines or tetraalkylammonium bases which may form the basis of the ammonium salts include especially those of one to eight carbon atoms per alkyl and preferably those with lower alkyl radicals such as one to four carbon atoms per alkyl. Particularly suitable salts are the chlorides, sulfates, phosphates, acetates, methosulfates and ethosulfates.

Examples of individual ammonium salts of amines are: methyl ammonium chloride, dimethylammonium chloride, trimethylammonium chloride, tetramethylammonium chloride, ethylammonium chloride, diethylammonium chloride, triethylammonium chloride, tetraethylammonium chloride, tetraethylammonium ethosulfate, tetramethylammonium methosulfate, propylammonium chloride, dipropylammonium chloride, butylammonium chloride, dibutylammonium chloride, tributylammonium chloride, triethylbenzylammonium chloride, trimethylbenzylammonium chloride, benzylammonium chloride and the corresponding sulfates, phosphates or acetates or mixtures of the same.

Only catalytic amounts of the ammonium salt are necessary for the reaction. It is advantageous to use from 0.1 to 0.8 mole and perferably from 0.2 to 0.5 mole of ammonium salt per mole of cyanide.

The reaction is carried out as a rule at a temperature of from 6C° to 160° C. Particularly high space-time yields and at the same time high purity and high yields are obtained at temperatures of from 80° to 140° C and for this reason this temperature range is preferably used. The reaction may also be carried out at temperatures above 160° C. This increases the speed of the reaction but at the same time the product of the process is less pure. If the reaction is carried out at a temperature above the boiling point of the solvent used as the reaction medium it is necessary to use superatmospheric pressure or to use a solvent whose boiling point is above the desired reaction temperature. The reaction is carried out as a rule at atmospheric pressure and this is economically advantageous.

The process according to the invention is conveniently carried out by placing the 1,4-diaminoanthraquinone (I) or its 2- or 2,3-chloro and/or bromo compound in the polar aprotic solvent with or without the ammonium salt in a reactor, heating the mixture to a temperature of from 60° to 160° C and then introducing the cyanide in portions. The reaction is generally over within one hour to twelve hours in the said temperature range. The product of the process may be precipitated from the reaction medium for example by dilution with water or by dilution with an organic liquid which does not dissolve the dinitrile. It is advantageous to distil off a large part of the aprotic polar solvent at subatmospheric pressure and to precipitate the product of the process in the bottoms by the said methods. Prior to filtration the precipitate is stirred until it has become easily filterable. The filter cake is washed with hot water until the liquid running away is colorless.

When starting from 1,4-diaminoanthraquinone the product of the process is the leuco compound which has to be oxidized to the anthraquinone derivative. In this case the reaction is advantageously carried out simultaneously in the presence of a dehydrogenating agent. The desired product of the process is obtained direct in this way. The leuco compound obtained in the absence of a dehydrogenating agent may also be isolated and oxidized to the 1,4-diaminoanthraquinone2,3-dinitrile in a separate stage. Since the product of the process is obtained in a higher yield when the reaction is carried out in the presence of a dehydrogenating agent this embodiment of the process is particularly preferred when using 1,4-diaminoanthraquinone as the starting material.

When the 2-chloro, 2-bromo, 2-chloro-3-bromo or 2-bromo-3-chloro compound (I) is used the 1,4-diaminoanthraquinone-2,3-dinitrile is immediately formed.

Examples of dehydrogenating agents which may be used in the process are finely divided sulfur, organic nitro compounds, oxygen, atmospheric oxygen, optionally in the presence of oxidation catalysts, Raney catalysts and also dimethylsulfoxide which may serve at the same time as the reaction medium, and also sodium nitrite. Examples of organic nitrogen compounds are nitrobenzene, dinitrobenzene and m-nitrobenzenesulfonic acid. These compounds are also preferably used for reasons of economy. It has proved to be advantageous first to dehydrogenate the leuco compound formed with a dehydrogenating agent such as sulfur and to reoxidize the hydrogenation products to sulfur in the same reaction stage. Organic nitro compounds, preferably nitrobenzene, dinitrobenzene and particularly m-nitrobenzenesulfonic acid or salts thereof are especially suitable for the said reoxidation. The amount of the nitro compounds used is at least that stoichiometrically necessary; as a rule a 10-molar excess and preferably a 1,5-molar to 5-molar excess of the nitro compounds is used.

A good result is also achieved with Raney catalysts and particularly with Raney nickel. The amount of catalyst is as a rule from 0.5 to 10% by weight and preferably from 1 to 5% by weight based on the 1,4-diaminoanthraquinone used. Moist Raney nickel may be added to the reaction mixture and air passed in. Raney nickel exhibits both a dehydrogenating effect and a reducing effect in this case.

The process according to the invention has the advantage that the polar aprotic solvent used as the reaction medium can easily be recovered by distillation and used again. Any cyanide contained in the residue may be destroyed and the residue made inoccuous by adding hydrogen peroxide so that loading of the waste water is kept at a minimum.

The following Examples will further illustrate the process according to the invention. Parts and percentages are by weight. Parts by volume bear the same relation to parts by weight as the liter to the kilogram.

EXAMPLE 1

20 parts of tetraethylammonium ethosulfate and 48 parts of 1,4-diaminoanthraquinone are introduced into 400 parts by volume of dimethylformamide and the mixture is heated to 120° to 125° C. At this temperature there is introduced in the course of thirty minutes 50 parts of sodium cyanide and then 24 parts of sodium m-nitrobenzenesulfonate is added in about twenty minutes. 6 parts of powdered sulfur is added and the whole is stirred at 120° to 125° C until all the 1,4-diaminoanthraquinone has been used up, this being the case after from 10 to 12 hours. After the whole has cooled to about 50° to 60° C the reaction mixture is poured into 2000 parts of water, air is passed through the mixture to oxidize leuco compound still present and finally the excess sodium cyanide is destroyed by adding 35 parts of 30% hydrogen peroxide at from 60° to 70° C while stirring. Suction filtration is carried out while the mixture is still warm and the filter cake is washed well with water and finally washed with methanol until the liquid running away is colorless. After drying, 47 parts of 1,4-diaminoanthraquinone-2,3-dinitrile is obtained which agrees chromatographically with the product obtained according to the process of German Pat. No. 1,108,704 and which has a melting point above 350° C. Recovery of the solvent may be carried out as described in Example 2 (b). An equally good product is obtained when an equivalent amount of trimethylbenzylammonium chloride is used instead of tetraethylammonium ethosulfate.

EXAMPLE 2 a. 20 parts of 1,4-diaminoanthraquinone and 25 parts of tetraethylammonium ethosulfate are introduced into 180 parts of dimethylsulfoxide and the mixture is heated to 80° C. Then 25 parts of sodium cyanide is introduced within 15 minutes and the whole is heated in the course of 2 hours to 120° to 125° C. Stirring is continued for another 2 hours at 120° to 125° C after which almost all of the starting material has reacted. After the whole has been cooled it is poured into 1000 parts by volume of a 15% solution of common salt which contains 30 parts of ammonium chloride. Air is blown through the suspension and the precipitate is suction filtered. The filtered material is washed with water until neutral and then washed with methanol until the liquid running away is almost colorless. The product is dried. 19.5 parts of 1,4-diamino-2,3-cyanoanthraquinone is obtained. The melting point is above 350° C. The product agrees chromatographically with the 1,4-diaminoanthraquinone-2,3-dinitrile obtained according to German Pat. No. 1,108,704.

The tetraethylammonium ethosulfate may be replaced by an equal amount of triethylbenzylammonium chloride, ammonium chloride or benzylammonium chloride with the same result.

The same product is obtained in the same high yield when the equivalent amount of potassium cyanide is used instead of sodium cyanide.

b. To recover the solvent the following method of processing is advantageous: after cooling, the reaction mixture is introduced into 900 parts by volume of cold methanol, air is blown through the suspension for a short period and the product is filtered and the filter cake is washed with methanol and dried. 19 parts of 1,4-diaminoanthraquinone-2,3-dinitrile of good purity is obtained. The combined filtrates are distilled; the two solvents can easily be separated and recovered because of the considerable difference between the boiling points of methanol and dimethylsulfoxide.

EXAMPLE 3

31 parts of 1,4-diamino-2,3-dichloroanthraquinone is introduced into 280 parts by volume of dimethylformamide and the whole is heated to 120° C. At this temperature 30 parts of sodium cyanide is introduced in about five minutes, the supply of heat being decreased because the temperature is maintained by the heat of reaction. After a short time the exothermic reaction ceases and the whole is heated at 125° to 130° C for about another 35 minutes. After this period the whole of the starting material has reacted. The whole is cooled to 110° C, 11 parts of ammonium chloride is added and the solvent is substantially distilled off at subatmospheric pressure; 200 to 210 parts by volume of dimethylformamide is recovered. The residue in the still is stirred vigorously while 300 parts of water is slowly added; the reaction product is thus precipitated. The whole is stirred for about another hour until the product has become easily filterable, and suction filtered while hot, and the filter cake is washed with hot water until the water running away has become colorless. The product is rinsed with methanol and dried. 26 parts of 1,4-diaminoanthraquinone-2,3-dinitrile is obtained. The product has the same properties as those obtained according to Examples 1 and 2.

The equivalent amount of 1,4-diamino-2,3-dibromoanthraquinone may be used with the same good results instead of 1,4-diamino-2,3-dichloroanthraquinone.

EXAMPLE 4

140 parts by volume of dimethylsulfoxide is placed in a reactor, 16 parts of 1,4-diamino-2-bromoanthraquinone is introduced while stirring and the whole is heated to 125° C. At this temperature 15 parts of sodium cyanide (or 19.5 parts of potassium cyanide) is added in about 15 minutes and the whole is stirred for about another 5 minutes at 125° C. After this period the starting material has reacted, and this may be confirmed by a chromatogram; if necessary the whole may be kept for another 5 to 15 minutes at 125° C. The hot reaction mixture is then introduced into 1000 parts by volume of 15% common salt solution, the precipitate is suction filtered, washed with hot water until the liquid running away is colorless and then rinsed with methanol. After drying, 12 parts of 1,4-diaminoanthraquinone-2,3-dinitrile having the same properties as those obtained according to Example 1 and 2 is obtained. When the equivalent amount of 1,4-diamino-2-chloroanthraquinone is used instead of 1,4-diamino2-bromoanthraquinone, practically the same yield of the dinitrile is obtained in the same quality.

EXAMPLE 5

A mixture of 200 parts by volume of N-methylpyrrolidone and 24 parts of 1,4-diaminoanthraquinone and 8 parts of tetramethylammonium chloride is heated to 120° to 125° C, 25 parts of sodium cyanide (or 37 parts of potassium cyanide) is introduced and with the heating decreased 0.5 part of Raney nickel moist with water is added. As soon as evolution of heat subsides a slow stream of air is passed through the mixture which is then stirred at 120° to 125° C for about another seven hours. The starting material is by then used up. After cooling, the reaction mixture is poured into 1000 parts by volume of a 15% solution of common salt which contains 40 parts by weight of ammonium chloride. After the product has been suction filtered and washed until neutral the filter cake is washed three times with 5% hydrochloric acid. Then it is washed with water until neutral and finally with methanol. After drying, 18.5 parts of 1,4-diaminoanthraquinone-2,3-dinitrile having the same properties as the dinitrile described in Examples 1 and 2 is obtained.

EXAMPLE 6

A suspension of 10 parts of 1,4-diaminoanthraquinone in 90 parts of dimethylsulfoxide is heated to 120° to 125° C, 12.5 parts of sodium cyanide is added all at once and then 5 parts of ammonium chloride is added within 15 minutes under an effective fume hood. The whole is stirred for another 3 hours at 120° to 125° C, whereupon one makes sure by a chromatogram that practically all of the starting material has been used up. The reaction mixture is allowed to cool and is diluted with 300 parts by volume of cold methanol, air is blown through under an effective fume hood for a short period, the precipitate is suction filtered and the filter cake is washed with methanol until the liquid running away is almost colorless. After drying, 9.5 parts of 1,4-diaminoanthraquinone-2,3-dinitrile is obtained.

The same result is obtained when an equal amount of methylammonium chloride, dimethylammonium chloride or triethylammonium chloride is used instead of ammonium chloride.

I claim:

1. A process for the production of 1,4-diaminoanthraquinone-2,3-dinitrile which comprises reacting a 1,4-diaminoanthraquinone of the formula

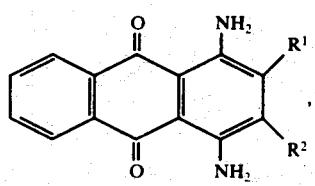

in which each of $R^1$ and $R^2$ is hydrogen, chloro or bromo with the proviso that at least one of $R^1$ and $R^2$ is chloro or bromo, at a temperature of from 60° up to about 160° C. in a polar aprotic solvent with at least the stoichiometrically required amount of an ionic cyanide.

2. A process as claimed in claim 1 wherein the polar aprotic solvent used in an N,N-$C_1$-to-$C_3$-dialkylamide of a $C_1$-to-$C_3$-carboxylic acid, N-formylmorpholine, N-formylpiperidine, N-methylpyrrolidone, hexa-$C_1$-to-$C_3$-alkylphosphoric acid triamide, dimethylsulfoxide, tetramethylenesulfoxide or a mixture of the same.

3. A process as claimed in claim 1 wherein dimethylformamide, N-methylpyrrolidone, dimethylsulfoxide or a mixture of the same is used as the polar aprotic solvent.

4. A process as claimed in claim 1 wherein the reaction is carried out at a temperature of from 80° to 140° C.

5. A process as claimed in claim 11 wherein 1,4-diaminoanthraquinone is reacted with an ionic cyanide in the presence of a chloride, sulfate, phosphate, acetate, methosulfate or ethosulfate of an ammonium salt derived from ammonia or a primary, secondary or tertiary amine of one to eight carbon atoms per alkyl or a tetraalkylammonium base of one to eight carbon atoms per alkyl and in the presence of a dehydrogenating agent.

6. A process as claimed in claim 5 wherein the ammonium salt used in ammonium chloride, methylammonium chloride, dimethylammonium chloride, trimethylammonium chloride, tetramethylammonium chloride, tetramethylammonium methosulfate, ethylammonium chloride, diethylammonium chloride, triethylammonium chloride, tetraethylammonium chloride, tetraethylammonium ethosulfate, propylammonium chloride, dipropylammonium chloride, tripropylammonium chloride, butylammonium chloride, dibutylammonium chloride, tributylammonium chloride, trimethylbenzylammonium chloride, triethylbenzylammonium chloride, benzylammonium chloride or the corresponding sulfate phosphate or acetate salts or a mixture of the same.

7. A process as claimed in claim 5 wherein the reaction is carried out in the presence of from 0.1 to 0.8 mole of ammonium salt per mole of cyanide.

8. A process as claimed in claim 5 wherein the dehydrogenating agent used in sulfur, an organic nitro compound, oxygen or air in the presence or absence of an oxidation catalyst, a Raney catalyst, dimethylsulfoxide or sodium nitrite.

9. A process as claimed in claim 5 wherein the dehydrogenating agent used is Raney nickel, dimethylsulfoxide, finely divided sulfur, nitrobenzene, dinitrobenzene, m-nitrobenzenesulfonic acid or a mixture of one of said nitro compounds with sulfur.

10. A process as claimed in claim 1 wherein the ionic cyanide is used in an amount which is one to five times the amount stoichiometrically required.

11. A process for the production of 1,4-diaminoanthraquinone-2,3-dinitrile which comprises reacting 1,4-diaminoanthraquinone at a temperature of from 60° up to about 160° C. in a polar aprotic solvent with at least the stoichiometrically required amount of an ionic cyanide, the reaction being carried out in the presence of an ammonium salt with the reaction product being dehydrogenated by means of a dehydrogenating agent.

12. A process as claimed in claim 11 wherein the reaction product formed by reacting said 1,4-diaminoanthraquinone with said cyanide is subsequently dehydrogenated.

13. A process as claimed in claim 11 wherein the reaction between said 1,4-diaminoanthraquinone and said cyanide is carried out under dehydrogenating conditions.

14. A process as claimed in claim 11 wherein the reaction is carried out at a temperature of from 80° to 140° C.

15. A process as claimed in claim 11 wherein the ionic cyanide is used in an amount which is one to five times the amount stoichiometrically required.

16. A process as claimed in claim 11 wherein the polar aprotic solvent used is an N,N-$C_1$-to-$C_3$-dialkylamide of a $C_1$-to-$C_3$-carboxylic acid, N-formylmorpholine, N-formylpiperidine, N-methylpyrrolidone, hexa-$C_1$-to-$C_3$-alkylphosphoric acid triamide, dimethylsulfoxide, tetramethylenesulfoxide or a mixture of the same.

17. A process as claimed in claim 11 wherein dimethylformamide, N-methylpyrrolidone, dimethylsulfoxide or a mixture of the same is used as the polar aprotic solvent.

* * * * *